US012514782B2

(12) United States Patent
Zhang

(10) Patent No.: US 12,514,782 B2
(45) Date of Patent: Jan. 6, 2026

(54) MASSAGE MODULE AND MASSAGE DEVICE

(71) Applicant: Shenzhen Winyi Technology Co.,Ltd, Shenzhen (CN)

(72) Inventor: Yong Zhang, Shenzhen (CN)

(73) Assignee: Shenzhen Winyi Technology Co., Ltd, Shenzhen (CN)

(*) Notice: Subject to any disclaimer, the term of this patent is extended or adjusted under 35 U.S.C. 154(b) by 0 days.

(21) Appl. No.: 19/175,469

(22) Filed: Apr. 10, 2025

(65) Prior Publication Data

US 2025/0235378 A1 Jul. 24, 2025

(30) Foreign Application Priority Data

Mar. 27, 2025 (CN) ......................... 202520566414.4

(51) Int. Cl.
*A61H 23/02* (2006.01)

(52) U.S. Cl.
CPC . *A61H 23/0254* (2013.01); *A61H 2201/0157* (2013.01); *A61H 2201/1215* (2013.01); *A61H 2201/123* (2013.01)

(58) Field of Classification Search
CPC ........ A61H 19/00; A61H 19/40; A61H 19/44; A61H 19/50; A61H 23/0254; A61H 2201/0157; A61H 2201/1215; A61H 2201/123
See application file for complete search history.

(56) References Cited

U.S. PATENT DOCUMENTS

2022/0031556 A1 2/2022 Liu et al.
2023/0277406 A1 9/2023 Kang et al.
2024/0238153 A1 7/2024 Hur et al.

FOREIGN PATENT DOCUMENTS

CN 221084137 U * 6/2024 ............. A61H 23/02

* cited by examiner

*Primary Examiner* — Tu A Vo
*Assistant Examiner* — Kelsey E Baller

(57) ABSTRACT

A massage module includes a housing, a rotary driving assembly and a linear motion assembly that are disposed within the housing, and a massage assembly slidably connected to the housing. When the rotary driving assembly operates, a telescopic transmission component is driven by the linear motion assembly to reciprocate axially. The telescopic transmission component drives, by means of circular truncated cones, a cambered support wall to expand radially, and the cambered support wall is restorable by an external force. In the above-mentioned manner, the form of massage can be changed, which is conducive to enhancing the massage experience.

16 Claims, 5 Drawing Sheets

MASSAGE MODULE AND MASSAGE DEVICE

CROSS-REFERENCE TO RELATED APPLICATIONS

This application claims priority to Chinese Patent Application No. 202520566414.4 with a filing date of Mar. 27, 2025. The content of the aforementioned application, including any intervening amendments thereto, is incorporated herein by reference.

TECHNICAL FIELD

The present disclosure relates to the technical field of health care equipment, and in particular to a massage module and a massage device.

BACKGROUND

There are various massage devices aimed at the human body in the market. Typically, these massage devices can achieve massage by squeezing and vibrating on parts of the human body, and can be adjustable in strength of massage by changing their frequencies, thereby achieving the purpose of relaxing the human body.

The vibration frequencies of current massage devices are typically adjusted by adjusting motor speeds such that the strength of massage is varied. Such massage devices mostly rely on frequency adjustment to achieve the effect of changing the strength of massage. However, massaging only by means of vibration may easily cause a person to feel numb in the contact part and may easily make the person nervous, thereby being not conducive to enhancing the massage experience.

SUMMARY OF PRESENT INVENTION

The technical problem to be solved by embodiments of the present disclosure is to provide a massage module and a massage device that can change the form of massage and are conducive to enhancing the massage experience.

The present disclosure provides a massage module including a housing, a rotary driving assembly and a linear motion assembly that are disposed within the housing, and a massage assembly slidably connected to the housing; the rotary driving assembly is in transmission connection with the linear motion assembly; a telescopic transmission component is connected to the linear motion assembly; the linear motion assembly includes a connecting rod, and a plurality of circular truncated cones disposed on the connecting rod; the circular truncated cones are arranged concentrically with the connecting rod and distributed at intervals along an axial direction of the connecting rod; the massage assembly includes a cambered support wall, and a plurality of guide pillars disposed on the cambered support wall; the cambered support wall is located on an outer side of the housing; the guide pillars are slidably connected to the housing, and tail ends of the guide pillars are abutted against inclined surfaces of the circular truncated cones in a one-to-one correspondence manner; when the rotary driving assembly operates, the telescopic transmission component is driven by the linear motion assembly to reciprocate axially; the telescopic transmission component drives, through the circular truncated cones, the cambered support wall to expand radially; and the cambered support wall is restorable under an external force.

Optionally, the linear motion assembly includes a holder connected to the rotary driving assembly, a sliding sleeve slidably connected to an outer ring of the holder axially, and a conduction shaft disposed within the holder; the sliding sleeve is connected to the telescopic transmission component; an opening extending axially is formed on a side of the holder; a clamping block matching the conduction shaft is disposed on the sliding sleeve; the clamping block is slidably connected to the opening; and when the conduction shaft rotates, the clamping block is driven to reciprocate linearly along an axial direction of the conduction shaft.

Optionally, an outer ring of the conduction shaft is provided with a right-handed screw groove and a left-handed screw groove, and two ends of the right-handed screw groove and the left-handed screw groove are correspondingly communicated, respectively; a clamping lug to be clamped with the right-handed screw groove and the left-handed screw groove is disposed on the clamping block; and the clamping lug is slidable along the right-handed screw groove and the left-handed screw groove.

Optionally, the rotary driving assembly includes a rotating motor, and a speed reducer in transmission connection with the rotating motor; a mounting base is connected to the speed reducer; the holder is connected to the mounting base; and an output shaft of the speed reducer is connected to the conduction shaft.

Optionally, the holder includes a base, and a sleeve connected to the base; an outer ring of the sleeve is in a shape of a regular polygon; and an inner ring of the sliding sleeve has a shape copying structure corresponding to the regular polygon such that the sleeve is slidably connected to the sliding sleeve.

Optionally, the telescopic transmission component further includes a first hoop connected to the connecting rod, and a second hoop engaged with the first hoop; and the sliding sleeve is clamped between the first hoop and the second hoop.

Optionally, a buckle is disposed on the first hoop; a clamping groove is formed in the second hoop; the buckle is capable of being clamped within the clamping groove; a limiting convex edge is further disposed on an inner side of the first hoop and/or the second hoop; a limiting groove is formed in an outer ring of the sliding sleeve; and the limiting convex edge is clamped within the limiting groove.

Optionally, the housing includes a first shell and a second shell that are engaged with each other; the housing is further wrapped with a flexible protective layer; and an outer side of the cambered support wall is capable of being abutted against the flexible protective layer.

Optionally, a cover is further disposed at an end of the connecting rod away from the linear motion assembly; a vibration motor is disposed within the cover; a clamping piece is further disposed within the housing; a limiting hole is formed in the clamping piece; and the connecting rod passes through the limiting hole and then is slidably connected to the clamping piece.

The present disclosure further provides a massage device including any massage module as described above.

Compared with the prior art, the massage module and the massage device provided by the embodiments of the present disclosure has the following beneficial effects: the rotary driving assembly is in transmission connection with the linear motion assembly such that the power generated by the rotary driving assembly can be transmitted to the linear motion assembly, causing the linear motion assembly to reciprocate linearly. The telescopic transmission component is connected to the linear motion assembly. The telescopic transmission component includes the connecting rod and the plurality of circular truncated cones disposed on the connecting rod. The circular truncated cones are arranged concentrically with the connecting rod and distributed at intervals along the axial direction of the connecting rod. Such a structure design allows an acting force to be applied to the tail ends of the guide pillars by the inclined surfaces of the circular truncated cones when the telescopic transmission component is moving linearly, such that the axial reciprocating motion of the telescopic transmission component causes the cambered support wall to expand radially. Meanwhile, the cambered support wall can be restored by an external force. This means that the cambered support wall can be restored to its original position after the externally applied force disappears, so that next massage action can be performed. In this way, it is avoided that the contact part has the feeling of numbness as easily caused by massaging only by means of vibration. Instead, massaging in the form of expanding outwards is performed. The form of massage is changed, which is conducive to enhancing the massage experience.

BRIEF DESCRIPTION OF THE DRAWINGS

The technical solutions of the present disclosure will be described in further detail below in conjunction with the drawings and embodiments. In the drawings.

Figure 1:
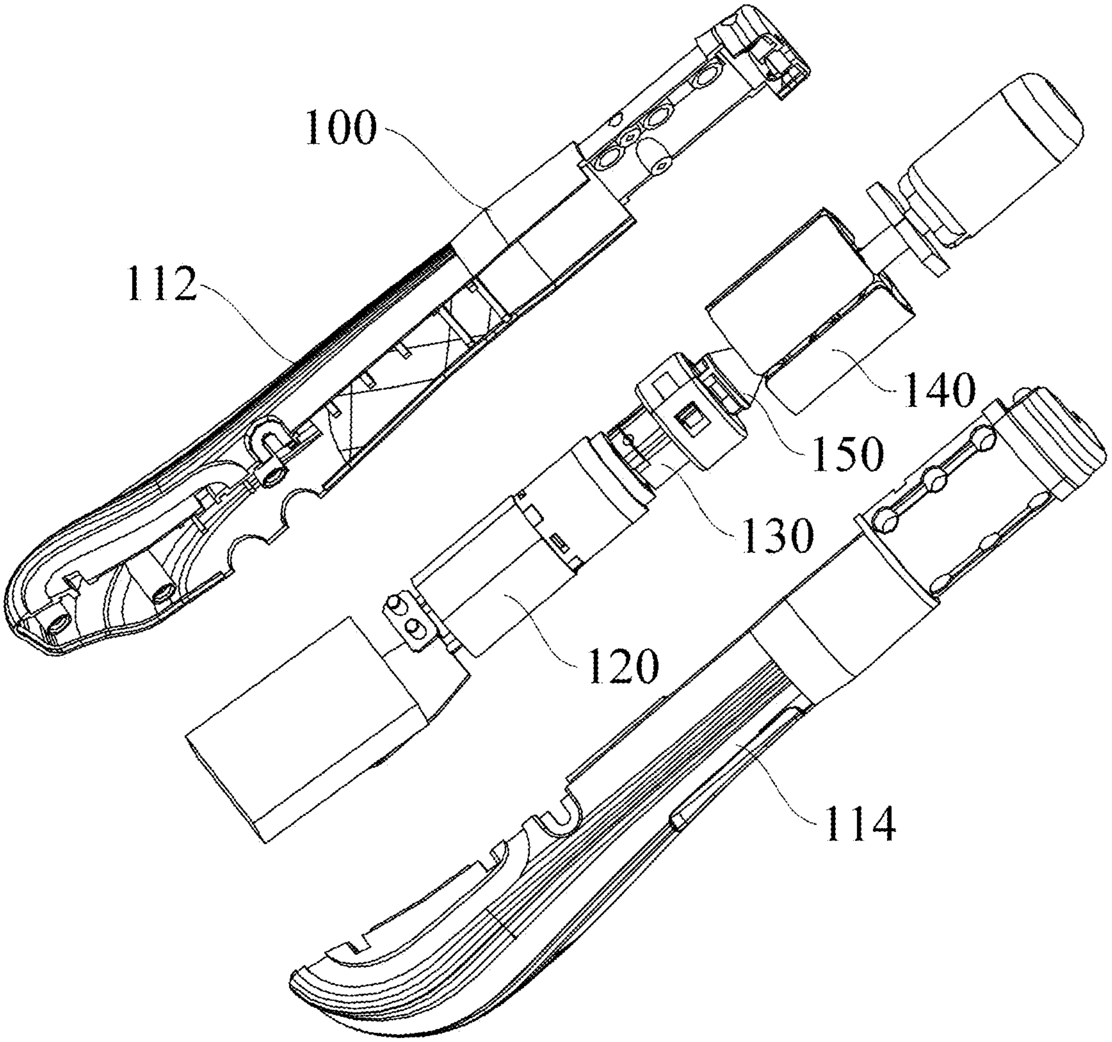
FIG. 1 is an exploded schematic diagram showing a massage module provided by an embodiment of the present disclosure.

The reference numerals used throughout the drawings each denote:

100, massage module; 110, housing; 112, first shell; 114, second shell; 116, clamping piece; 120, rotary driving assembly; 122, rotating motor; 124, speed reducer; 1242, output shaft; 126, mounting base; 130, linear motion assembly; 132, holder; 1322, base; 1324, sleeve; 134, sliding sleeve; 1342, limiting groove; 136, conduction shaft; 138, clamping block; 140, massage assembly; 142, cambered support wall; 144, guide pillar; 150, telescopic transmission component; 152, connecting rod; 154, circular truncated cone; 156, first hoop; 1562, buckle; 158, second hoop; 1582, clamping groove; 159, limiting convex edge; 160, cover; and 162, vibration motor.

DETAILED DESCRIPTION OF THE EMBODIMENTS

It should be noted that the embodiments in the present disclosure and features in the embodiments may be combined with each other in a non-conflicting situation. Preferred embodiments of the present disclosure are now described in detail with reference to the accompanying drawings.

Figure 2:
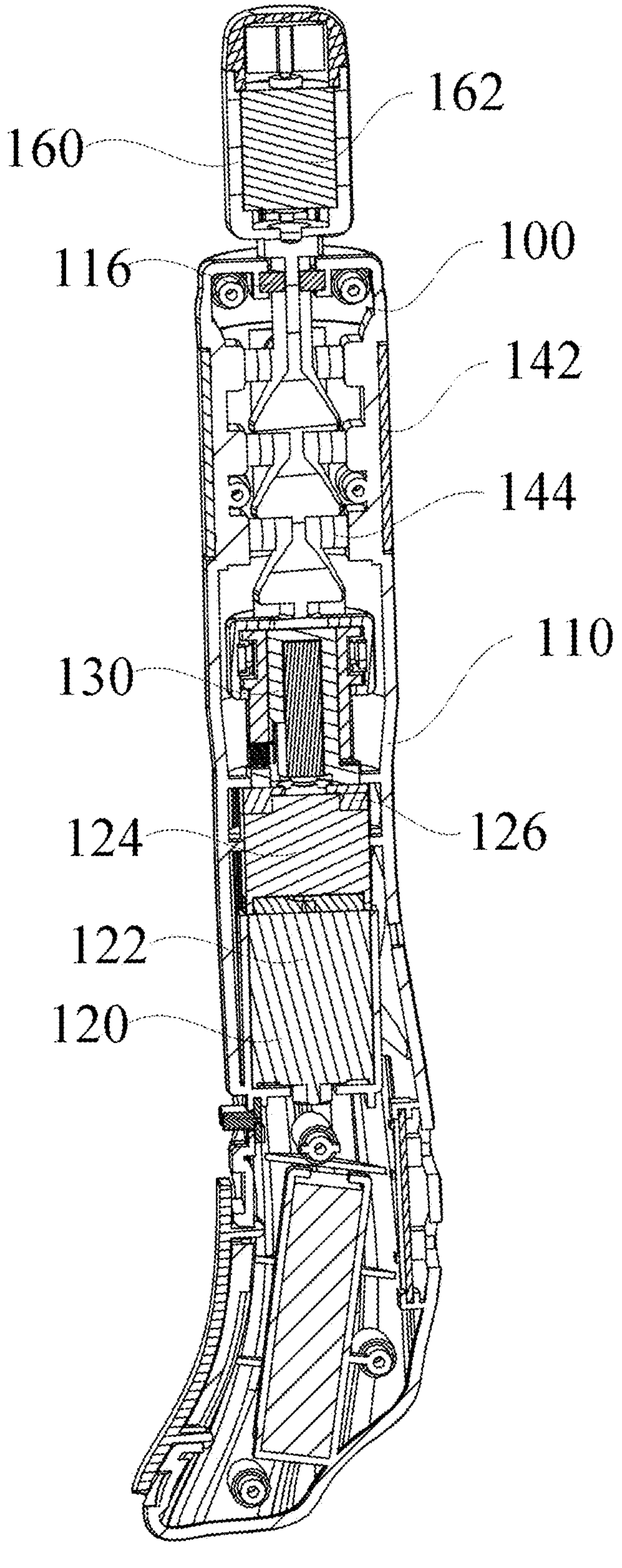
FIG. 2 is a sectional schematic diagram showing a massage module provided by an embodiment of the present disclosure.
Figure 3:
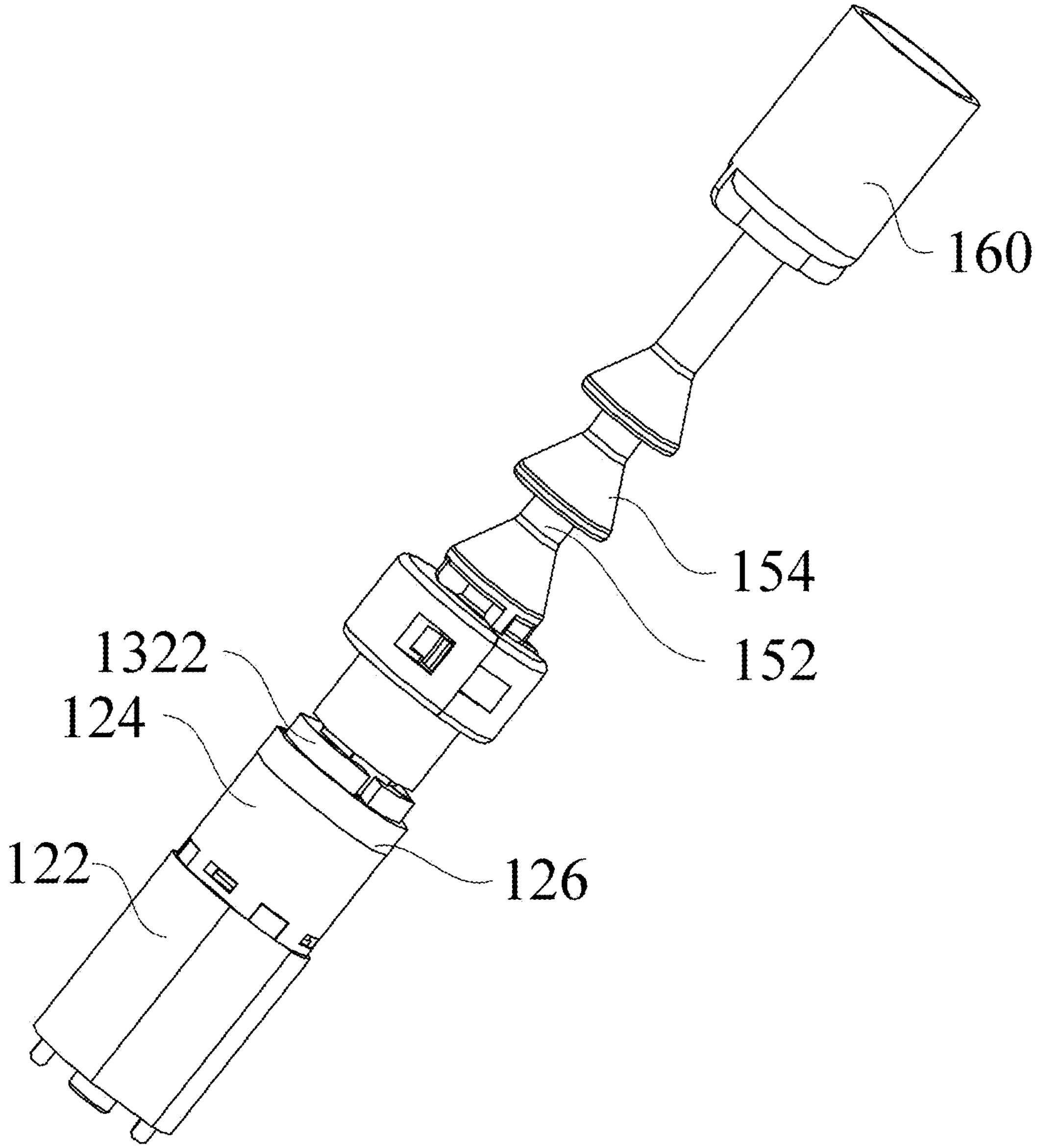
FIG. 3 is a structural schematic diagram showing connection of a rotary driving assembly with a telescopic transmission component provided by an embodiment of the present disclosure.

As shown in FIG. 1, FIG. 2, and FIG. 3, the present disclosure provides a massage module 100 including a housing 110, a rotary driving assembly 120 and a linear motion assembly 130 that are disposed within the housing 110, and a massage assembly 140 slidably connected to the housing 110. The rotary driving assembly 120 is in transmission connection with the linear motion assembly 130. A telescopic transmission component 150 is connected to the linear motion assembly 130. The linear motion assembly 150 includes a connecting rod 152, and a plurality of circular truncated cones 154 disposed on the connecting rod 152. The circular truncated cones 154 are arranged concentrically with the connecting rod 152 and distributed at intervals along an axial direction of the connecting rod 152. The massage assembly 140 includes a cambered support wall 142, and a plurality of guide pillars 144 disposed on the cambered support wall 142. The cambered support wall 142 is located on an outer side of the housing 110. The guide pillars 144 are slidably connected to the housing 110, and tail ends of the guide pillars 144 are abutted against inclined surfaces of the circular truncated cones 154 in a one-to-one correspondence manner. When the rotary driving assembly 120 operates, the telescopic transmission component 150 is driven by the linear motion assembly 130 to reciprocate axially. The telescopic transmission component 150 drives, by means of the circular truncated cones 154, the cambered support wall 142 to expand radially, and the cambered support wall 142 is restorable by an external force.

In particular, the housing 110 mainly plays a role in protecting internal assemblies and also provides a mounting foundation for other assemblies. There are a plurality of cambered support walls 142 disposed surrounding an outer ring of the housing 110 such that the cambered support walls 142 can expand radially to evenly support the outer ring.

The massage module 100 provided by the embodiments of the present disclosure, the rotary driving assembly 120 is in transmission connection with the linear motion assembly 130 such that the power generated by the rotary driving assembly 120 can be transmitted to the linear motion assembly 130, causing the linear motion assembly 130 to reciprocate linearly. The telescopic transmission component 150 is connected to the linear motion assembly 130. The telescopic transmission component 150 includes the connecting rod 152 and the plurality of circular truncated cones 154 disposed on the connecting rod 152. The circular truncated cones 154 are arranged concentrically with the connecting rod 152 and distributed at intervals along the axial direction of the connecting rod 152. Such a structure design allows an acting force to be applied to the tail ends of the guide pillars 144 by the inclined surfaces of the circular truncated cones 154 when the telescopic transmission component 150 is moving linearly, such that the axial reciprocating motion of the telescopic transmission component 150 causes the cambered support wall 142 to expand radially. Meanwhile, the cambered support wall 142 can be restored by an external force. This means that the cambered support wall 142 can be restored to its original position after the externally applied force disappears, so that next massage action can be performed. In this way, it is avoided that the contact part has the feeling of numbness as easily caused by massaging only by means of vibration. Instead, massaging in the form of expanding outwards is performed. The form of massage is changed, which is conducive to enhancing the massage experience.

Figure 4:
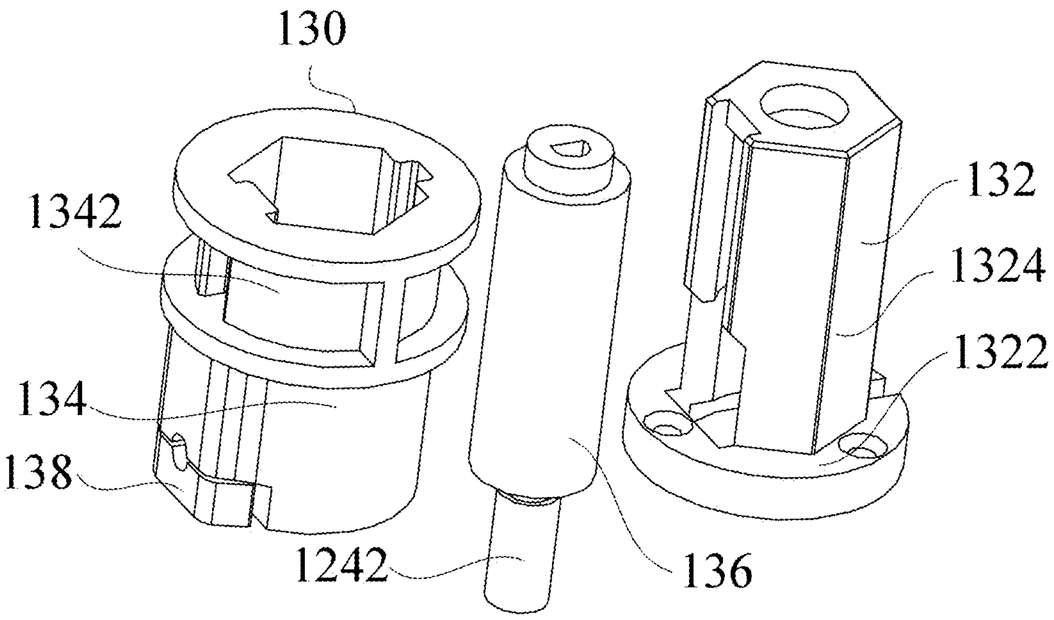
FIG. 4 is an exploded schematic diagram showing a linear motion assembly provided by an embodiment of the present disclosure.

As shown in FIG. 4, the linear motion assembly 130 includes a holder 132 connected to the rotary driving assembly 120, a sliding sleeve 134 slidably connected to an outer ring of the holder 132 axially, and a conduction shaft 136 disposed within the holder 132. The sliding sleeve 134 is connected to the telescopic transmission component 150. An opening extending axially is formed on a side of the holder 132. A clamping block 138 matching the conduction shaft 136 is disposed on the sliding sleeve 134. The clamping block 138 is slidably connected to the opening. When the conduction shaft 136 rotates, the clamping block 138 can be driven to reciprocate linearly along an axial direction of the conduction shaft 136.

In particular, by means of cooperation of the holder 132, the sliding sleeve 134, and the conduction shaft 136, the rotary motion of the rotary driving assembly 120 can be exactly converted into the axial linear reciprocating motion of the sliding sleeve 134. The sliding sleeve 134 is connected to the telescopic transmission component 150 so as to drive the telescopic transmission component 150 to move synchronously. Such exact motion transmission guarantees that the telescopic transmission component 150 can move in a predetermined manner, thereby realizing accurate radial expansion of the cambered support wall 142 and improving the massage effect and accuracy of the massage module 100. In addition, this structure design of the linear motion assembly 130 makes a layout of the components compact, occupying small space. In limited space within the housing 110, the assemblies can be arranged reasonably such that the space utilization rate of the massage module 100 is increased. Meanwhile, this is also conducive to the miniaturization and portability design of the massage module 100.

In an optional embodiment of the present disclosure, an outer ring of the conduction shaft 136 is provided with a right-handed screw groove and a left-handed screw groove, and two ends of the right-handed screw groove and the left-handed screw groove are correspondingly communicated, respectively. A clamping lug to be clamped with the right-handed screw groove and the left-handed screw groove is disposed on the clamping block 138. The clamping lug is slidable along the right-handed screw groove and the left-handed screw groove.

In particular, the clamping lug to be clamped with the right-handed screw groove and the left-handed screw groove is disposed on the clamping block 138. The clamping lug is slidable along the right-handed screw groove and the left-handed screw groove. When the conduction shaft 136 rotates, the clamping lug slides within the right-handed screw groove and the left-handed screw groove. Due to the right-handed screw groove and the left-handed screw groove having opposite screw directions and being communicated at both ends, the clamping lug will reciprocate axially in the rotation process of the conduction shaft 136, thereby putting the sliding sleeve 134 in axial linear reciprocating motion. The structure of the right-handed screw groove and the left-handed screw groove on the conduction shaft 136 and the clamping lug on the clamping block 138 is relatively simple with low difficulties in manufacturing and machining. Meanwhile, such a structure has high reliability in actual use, thereby reducing the probability of failure occurrence caused by component damage and reducing the maintenance cost. In addition, the above-mentioned arrangement form can achieve the axial reciprocating motion of the sliding sleeve 134 by only requiring the rotary driving assembly 120 to rotate continuously in the same direction, thus making the whole body steadier and more reliable. In the use process, the expanding motion at different frequencies can be achieved only by adjusting the rotating speed of the rotary driving assembly 120. The adaptability of the massage module 100 and the user experience are improved.

As shown in FIG. 2, the rotary driving assembly 120 includes a rotating motor 122, and a speed reducer 124 in transmission connection with the rotating motor 122. A mounting base 126 is connected to the speed reducer 124. The holder 132 is connected to the mounting base 126, and an output shaft 1242 of the speed reducer 124 is connected to the conduction shaft 136.

In particular, the rotating motor 122 is a power source for the whole massage module 100, providing rotary motion. The speed reducer 124 is in transmission connection with the rotating motor 122, and plays a role in reducing the speed of the rotating motor 122 and increasing the torque at the same time to meet the requirement of the linear motion assembly 130 for power. The mounting base 126 is connected to the speed reducer 124, the holder 132 is connected to the mounting base 126, and the output shaft 1242 of the speed reducer 124 is connected to the conduction shaft 136, thereby providing mounting support for the whole linear motion assembly 130, guaranteeing accurate relative position between the components, and enabling effective transmission of the power.

As shown in FIG. 4, the holder 132 includes a base 1322, and a sleeve 1324 connected to the base 1322. An outer ring of the sleeve 1324 is in a shape of a regular polygon, and an inner ring of the sliding sleeve 134 has a shape copying structure corresponding to the regular polygon such that the sleeve 1324 is slidably connected to the sliding sleeve 134.

In particular, the base 1322 is configured to fix and support the whole holder 132. The sleeve 1324 serves as a track for the sliding sleeve 134 to slide. The design of the outer ring in the shape of the regular polygon and the inner ring of the shape copying structure guarantees that the sliding sleeve 134 only can slide axially on the sleeve 1324, thereby limiting the circumferential rotation of the sliding sleeve 134. In this way, it is advantageous for guaranteeing that the sliding sleeve 134 accurately transmits the motion of the conduction shaft 136 to the telescopic transmission component 150, thereby improving the accuracy and stability of the motion of the massage module 100. In addition, the arrangement form of the holder 132 allows it to have high structural strength and stability. Due to the connection of the base 1322 and the sleeve 1324 and the cooperation of the sleeve 1324 with the sliding sleeve 134, a large external force and a large impact force in the motion process can be borne. The probability of failure occurrence caused by unstable structure is reduced. The service life of the massage module 100 is prolonged.

Figure 5:
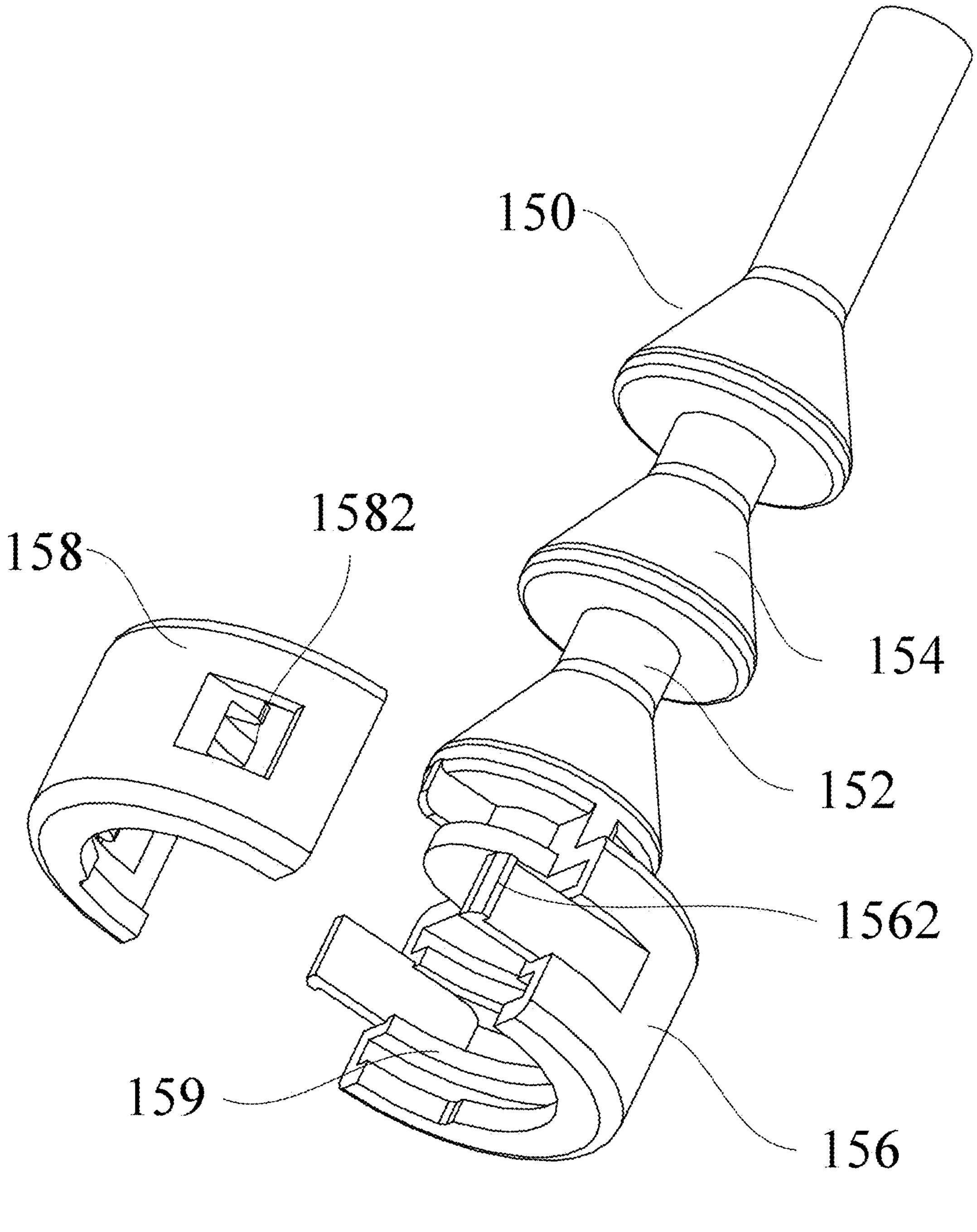
FIG. 5 is an exploded schematic diagram showing a telescopic transmission component provided by an embodiment of the present disclosure.

As shown in FIG. 5, the telescopic transmission component 150 further includes a first hoop 156 connected to the connecting rod 152, and a second hoop 158 engaged with the first hoop 156. The sliding sleeve 134 is clamped between the first hoop 156 and the second hoop 158.

In particular, the design of the first hoop 156 and the second hoop 158 provides a reliable connection manner for the sliding sleeve 134 and the connecting rod 152. By clamping the sliding sleeve 134 between the first hoop 156 and the second hoop 158, it can be ensured that the sliding sleeve 134 does not slide relative to the connecting rod 152 in the motion process, thereby guaranteeing the accuracy and stability of power transmission. In addition, such a hoop-type connection manner is relatively simple and convenient in the mounting and removal processes. The sliding sleeve 134 can be conveniently mounted on or removed from the connecting rod 152 only by engaging or disengaging the first hoop 156 and the second hoop 158. This is convenient for the maintenance and overhaul of the massage module 100.

With continued reference to FIG. 5, a buckle 1562 is disposed on the first hoop 156. A clamping groove 1582 is formed in the second hoop 158. The buckle 1562 is capable of being clamped within the clamping groove 1582. A limiting convex edge 159 is further disposed on an inner side of the first hoop 156 and/or the second hoop 158. A limiting groove 1342 is formed in an outer ring of the sliding sleeve 134. The limiting convex edge 159 is clamped within the limiting groove 1342.

In particular, the cooperation of the buckle 1562 and the clamping groove 1582 and the cooperation of the limiting convex edge 159 and the limiting groove 1342 make the connection between the first hoop 156 and the second hoop 158 and the connection between the sliding sleeve 134 and the hoop more secure. In the motion process of the massage module 100, the relative motion between the sliding sleeve 134 and the connecting rod 152 can be effectively prevented, thereby guaranteeing the reliability of power transmission and improving the overall performance of the massage module 100. In addition, the limiting convex edge 159 and the limiting groove 1342 are configured to limit the connecting rod 152 axially, avoiding dislocation or loosing in the motion process. In actual use, the limiting convex edge 159 is a circumferentially interrupted vertical groove. A vertical rib corresponding to the vertical groove is arranged within the limiting groove 1342. When the vertical groove is in clamped fit with the vertical rib, the sliding sleeve 134 can be effectively prevented from circumferentially rotating between the first hoop 156 and the second hoop 158, thereby avoiding inaccurate massage actions or failure occurrence caused by the circumferential rotation of the connecting rod 152.

As shown in FIG. 1, the housing 110 includes a first shell 112 and a second shell 114 that are engaged with each other. The housing 110 is further wrapped with a flexible protective layer. An outer side of the cambered support wall 142 can be abutted against the flexible protective layer.

In particular, the housing 110 includes the first shell 112 and the second shell 114 that are engaged with each other. This design is convenient for the manufacturing of the housing 110 and the mounting of internal assemblies. The housing 110 is further wrapped with the flexible protective layer which can provide more comfortable use experience for a user. The flexible protective layer can not only protect the housing 110, but also provide certain buffering and comfort when the cambered support wall 142 expands radially, thereby preventing the user from direct contact with the stiff housing 110. In addition, the flexible protective layer may be made of silicone and has certain resilience itself, which is conducive to causing the cambered support wall 142 to be restored. The cambered support wall 142 may also be restored by relying on a pressing force in the contact position. Meanwhile, the flexible protective layer also guarantees the safety of internal assemblies, reduces the risks of exposure of internal assemblies and failure occurrence, and is also conducive to avoiding external impurities from entering the housing 110 to affect the mutual transmission of internal components.

As shown in FIG. 2, a cover 160 is further disposed at an end of the connecting rod 152 away from the linear motion assembly 130. A vibration motor 162 is disposed within the cover 160. A clamping piece 116 is further disposed within the housing 110. A limiting hole is formed in the clamping piece 116. The connecting rod 152 passes through the limiting hole and then is slidably connected to the clamping piece 116.

In particular, the clamping piece 116 is disposed within the housing 110. The limiting hole is formed in the clamping piece 116. The connecting rod 152 passes through the limiting hole and then is slidably connected to the clamping piece 116. The clamping piece 116 and the limiting hole play a role in limiting the motion of the connecting rod 152, guaranteeing that the connecting rod 152 can move along a predetermined direction in the motion process and also providing certain support for the connecting rod 152. The reliability of the connecting rod 152 when acting is guaranteed, and the connecting rod 152 is avoided from swaying or deviating in the motion process, thereby guaranteeing the motion accuracy of the cambered support wall 142 and the stability of the massage effect. In addition, with the vibration motor 162, a vibrating massage function can be further provided. The diversified massage functions can meet different massage requirements of the user, thereby improving the applicability of the massage module 100 and the degree of satisfaction of the user. The user can select different massage manners or use a plurality of massage manners simultaneously according to the user's own preference and physical condition.

The present disclosure further provides a massage device including the massage module 100 in the aforesaid embodiments. The massage device includes the same structures and beneficial effects with the massage module 100 in the aforesaid embodiments. The structure and beneficial effects of the massage module 100 have been described in detail in the aforementioned embodiments, and will not be repeated here.

It should be understood that the above embodiments are only used to explain, rather than limit, the technical solutions of the present disclosure. For those skilled in the art, the technical solutions described in the above embodiments may be modified or some of the technical features may be replaced equivalently. All such modifications and replacements shall fall within the scope of protection of the appended claims the present disclosure.

What is claimed is:

1. A massage module, comprising a housing, a rotary driving assembly and a linear motion assembly that are disposed within the housing, and a massage assembly slidably connected to the housing;

wherein the rotary driving assembly is in transmission connection with the linear motion assembly; a telescopic transmission component is connected to the linear motion assembly; the linear motion assembly comprises a connecting rod, and a plurality of circular truncated cones disposed on the connecting rod; the plurality of circular truncated cones are arranged concentrically with the connecting rod and distributed at intervals along an axial direction of the connecting rod; the massage assembly comprises a cambered support wall, and a plurality of guide pillars disposed on the cambered support wall; the cambered support wall is located on an outer side of the housing; the plurality of guide pillars are slidably connected to the housing, and tail ends of the plurality of guide pillars are abutted against inclined surfaces of the plurality of circular truncated cones in a one-to-one correspondence manner;

when the rotary driving assembly operates, the telescopic transmission component is driven by the linear motion assembly to reciprocate axially; the telescopic transmission component drives, through the plurality of circular truncated cones, the cambered support wall to expand radially; and the cambered support wall is restorable under an external force;

the linear motion assembly comprises a holder connected to the rotary driving assembly, a sliding sleeve slidably connected to an outer ring of the holder axially, and a conduction shaft disposed within the holder; the sliding sleeve is connected to the telescopic transmission component; an opening extending axially is formed on a side of the holder; a clamping block matching the conduction shaft is disposed on the sliding sleeve; the clamping block is slidably connected to the opening; and when the conduction shaft rotates, the clamping block is driven to reciprocate linearly along an axial direction of the conduction shaft;

an outer ring of the conduction shaft is provided with a right-handed screw groove and a left-handed screw groove, and two ends of the right-handed screw groove and two ends of the left-handed screw groove are correspondingly communicated, respectively; a clamping lug to be clamped with the right-handed screw groove and the left-handed screw groove is disposed on the clamping block; and the clamping lug is slidable along the right-handed screw groove and the left-handed screw groove.

2. The massage module according to claim 1, wherein the rotary driving assembly comprises a rotating motor, and a speed reducer in transmission connection with the rotating motor; a mounting base is connected to the speed reducer; the holder is connected to the mounting base; and an output shaft of the speed reducer is connected to the conduction shaft.

3. The massage module according to claim 2, wherein the holder comprises a base, and a sleeve connected to the base; an outer ring of the sleeve is in a shape of a regular polygon; and an inner ring of the sliding sleeve has a shape copying structure corresponding to the regular polygon such that the sleeve is slidably connected to the sliding sleeve.

4. The massage module according to claim 3, wherein the telescopic transmission component further comprises a first hoop connected to the connecting rod, and a second hoop engaged with the first hoop; and the sliding sleeve is clamped between the first hoop and the second hoop.

5. The massage module according to claim 4, wherein a buckle is disposed on the first hoop; a clamping groove is formed in the second hoop; the buckle is capable of being clamped within the clamping groove; a limiting convex edge is further disposed on an inner side of the first hoop and/or the second hoop; a limiting groove is formed in an outer ring of the sliding sleeve; and the limiting convex edge is clamped within the limiting groove.

6. The massage module according to claim 1, wherein the holder comprises a base, and a sleeve connected to the base; an outer ring of the sleeve is in a shape of a regular polygon; and an inner ring of the sliding sleeve has a shape copying structure corresponding to the regular polygon such that the sleeve is slidably connected to the sliding sleeve.

7. The massage module according to claim 6, wherein the telescopic transmission component further comprises a first hoop connected to the connecting rod, and a second hoop engaged with the first hoop; and the sliding sleeve is clamped between the first hoop and the second hoop.

8. The massage module according to claim 7, wherein a buckle is disposed on the first hoop; a clamping groove is formed in the second hoop; the buckle is capable of being clamped within the clamping groove; a limiting convex edge is further disposed on an inner side of the first hoop and/or the second hoop; a limiting groove is formed in an outer ring of the sliding sleeve; and the limiting convex edge is clamped within the limiting groove.

9. The massage module according to claim 6, wherein the housing comprises a first shell and a second shell that are engaged with each other; the housing is further wrapped with a flexible protective layer; and an outer side of the cambered support wall is capable of being abutted against the flexible protective layer.

10. The massage module according to claim 1, wherein the telescopic transmission component further comprises a first hoop connected to the connecting rod, and a second hoop engaged with the first hoop; and the sliding sleeve is clamped between the first hoop and the second hoop.

11. The massage module according to claim 10, wherein a buckle is disposed on the first hoop; a clamping groove is formed in the second hoop; the buckle is capable of being clamped within the clamping groove; a limiting convex edge is further disposed on an inner side of the first hoop and/or the second hoop; a limiting groove is formed in an outer ring of the sliding sleeve; and the limiting convex edge is clamped within the limiting groove.

12. The massage module according to claim 11, wherein the housing comprises a first shell and a second shell that are engaged with each other; the housing is further wrapped with a flexible protective layer; and an outer side of the cambered support wall is capable of being abutted against the flexible protective layer.

13. The massage module according to claim 10, wherein the housing comprises a first shell and a second shell that are engaged with each other; the housing is further wrapped with a flexible protective layer; and an outer side of the cambered support wall is capable of being abutted against the flexible protective layer.

14. The massage module according to claim 1, wherein the housing comprises a first shell and a second shell that are engaged with each other; the housing is further wrapped with a flexible protective layer; and an outer side of the cambered support wall is capable of being abutted against the flexible protective layer.

15. The massage module according to claim 14, wherein a cover is further disposed at an end of the connecting rod away from the linear motion assembly; a vibration motor is disposed within the cover; a clamping piece is further disposed within the housing; a limiting hole is formed in the clamping piece; and the connecting rod passes through the limiting hole and then is slidably connected to the clamping piece.

16. A massage device, comprising the massage module according to claim 1.

* * * * *